(12) United States Patent
Riedlinger et al.

(10) Patent No.: US 6,446,187 B1
(45) Date of Patent: Sep. 3, 2002

(54) VIRTUAL ADDRESS BYPASSING USING LOCAL PAGE MASK

(75) Inventors: Reid James Riedlinger; Samuel D Naffziger; Douglas J Cutter; Christopher Craig Seib, all of Fort Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/507,432

(22) Filed: Feb. 19, 2000

(51) Int. Cl.[7] .............................................. G06F 12/00
(52) U.S. Cl. ........................ 711/206; 711/202; 711/211; 711/212; 711/220; 711/3
(58) Field of Search ................................. 711/206, 202, 711/211, 212, 220, 3, 168, 203, 108, 118, 137, 138; 707/2; 710/49, 262; 712/224

(56) References Cited

U.S. PATENT DOCUMENTS

| | | | | |
|---|---|---|---|---|
| 5,465,337 A | * | 11/1995 | Kong ........................... | 711/207 |
| 5,598,553 A | * | 1/1997 | Richter et al. ................ | 703/23 |
| 5,752,275 A | * | 5/1998 | Hammond ................... | 711/207 |
| 5,765,209 A | * | 6/1998 | Yetter .......................... | 711/207 |
| 5,784,709 A | * | 7/1998 | McLellan et al. ........... | 711/207 |
| 6,014,732 A | * | 1/2000 | Naffziger .................... | 711/203 |
| 6,216,214 B1 | * | 4/2001 | Bryg et al. .................. | 711/207 |
| 6,266,755 B1 | * | 7/2001 | Yeager ........................ | 711/210 |
| 6,282,625 B1 | * | 8/2001 | Porterfield .................. | 711/206 |

FOREIGN PATENT DOCUMENTS

EP  0-508-577 A1  *  10/1992  ........... G06F/12/10

* cited by examiner

Primary Examiner—Hong Kim

(57) ABSTRACT

A cache with a translation lookaside buffer (TLB) that reduces the time required for retrieval of a physical address from the TLB when accessing the cache in a system that supports variable page sizing. The TLB includes a content addressable memory (CAM) containing the virtual page numbers corresponding to pages in the cache and a random access memory (RAM) storing the physical page numbers of the pages corresponding to the virtual page numbers in the CAM. The physical page number RAM stores a page mask along with the physical page numbers, and includes local multiplexers which perform virtual address bypassing of the physical page number when the page has been masked.

4 Claims, 10 Drawing Sheets

VIRTUAL ADDRESS BYPASSING USING LOCAL PAGE MASK

FIELD OF THE INVENTION

The present invention pertains generally to cache memory access in digital computers, and more particularly to a method and circuit for improving cache access time in systems which support variable page sizes.

BACKGROUND OF THE INVENTION

Modern digital computers typically employ a multilevel hierarchy of memory systems, with relatively fast, expensive, limited-capacity memory at the highest level of the hierarchy and proceeding to relatively slower, lower cost, higher-capacity memory at the lowest level of the hierarchy. Typically, the hierarchy includes a small fast memory called a cache, either physically integrated within a processor integrated circuit or mounted physically close to the processor for speed.

The processor includes a memory management system. The purpose of the memory management system is to dynamically select which data is to be stored in each level of the memory hierarchy and to control the transfer of data therebetween. Data is accessed from the highest level memory cache. The memory management system therefore attempts to ensure, if possible, that the data is present in the highest level cache at the time the processor requests it. Typically this is accomplished by maintaining the most recently accessed data in the highest level cache. If a processor requests an item from a cache and the item is present in the cache, the event is called a cache hit, and the requesting address (referred to herein as the "virtual" address) is translated to a corresponding "physical" address in the TLB RAM. If a processor requests an item from a cache and the item is not present in the cache, the event is called a cache miss, which causes an exception to be generated known as a "page fault". When the operating system services the page fault, typically some form of "least recently used" (LRU) technique is used to expunge that page from RAM, load the required page from a lower level of the memory hierarchy, and restart the address request. In many processor designs, the time required to access an item for a cache hit is one of the primary limiters for the clock rate of the processor. Therefore, optimization of access time for cache hits is critical for performance. There is an ongoing need for improvement in cache access time for computer processors.

Typically, a memory is organized into words (for example, 32 bits or 64 bits per word). Typically, the minimum amount of memory that can be transferred between a cache and a next lower level of the memory hierarchy is called a line, or sometimes a block. A line is typically multiple words (for example, 16 words per line). Memory may also be divided into pages (also called segments), with many lines per page. In some systems, page size may be variable.

Virtual memory (paging or segmentation) requires a data structure, sometimes called a page table, that translates the virtual address to the physical address. To reduce address translation time, computers commonly use a specialized associative cache dedicated to address translation, commonly called a Translation Look-aside Buffer (TLB).

The TLB stores a table of virtual addresses and corresponding physical addresses of data pages contained in the cache memory. When data is to be accessed, a search using the virtual address of the data is performed on the TLB to determine whether the page containing the data is in the faster cache memory. If not, the data page must be fetched from a lower-level memory and loaded into the cache.

An important memory performance issue is the page size. In this regard, since a program typically does not take up an integral number of pages, using a large fixed page size typically wastes memory. This concept is known as page fragmentation. By way of example, if the page size is four Gigabytes and the program needs only 26 Kilobytes, then only one page will be necessary for the program. In a processor that does not allow process sharing of pages, nearly all of the 4 Gigabyte page will be wasted in fragmentation.

On the other hand, if the page size is made too small, the directory and page tables must be larger in order to cover the same amount of memory space. By way of example, in a system employing four Kilobyte pages, a one Megabyte memory space would have to be divided into two hundred fifty pages—almost a quarter of an entire one Kilobyte page table. Moreover, for the same amount of address space with smaller pages, the transfer time to fill the RAM from disk becomes longer because of the associated overhead with individual page reads and writes and because it is possible that the pages are stored in non-contiguous disk space, requiring multiple accesses to the disk.

Accordingly, some computer architectures support the use of variable page sizes. The support of variable page sizes by a TLB solves many of the problems mentioned above that result from fixed page size TLBs. However, prior cache systems that support variable page sizing use a page masking technique that can result in slower cache performance. In particular, prior implementations of variable page masking methodologies store a page mask in along with the virtual address in the TLB. When a cache hit occurs, the page mask is read out of the virtual address stored in the matching entry of the TLB. The page mask signals from the matching virtual address entry of the TLB are then used to control respective virtual address bypass multiplexers, which multiplex the virtual address bits and corresponding bits in the physical address from the physical page number RAM in the matching TLB entry. If a bit is masked, the virtual address bypass multiplexer associated with that bit selects the corresponding virtual page number bit from the virtual address, which is then sent out as part of the physical address. This process is necessary since the bits that were masked out in the virtual address essentially generated a larger page size, and therefore the bits that were masked during the virtual address lookup must be used as part of the offset into the page.

The virtual address to physical address translation is must be performed as quickly as possible in cache memory. The additional multiplexing operation for virtual address bypassing required in systems that support variable page sizes limits the translation speed. Accordingly, there is a need for improvement in the virtual address bypass architecture.

SUMMARY OF THE INVENTION

The present invention is a novel method and apparatus for performing virtual address bypassing using a page mask stored, and locally multiplexed, within the physical address RAM of the TLB. The local virtual address bypassing multiplexing operation of the invention allows the multiplexing function to be performed prior to the occurrence of a TLB hit, thereby eliminating any post-match multiplexing delay. This technique significantly reduces the virtual address to physical address translation time.

In accordance with the invention, the page mask is stored along with the physical address in the physical page number RAM. Each page mask bit controls a corresponding local multiplexer which receives the virtual address bit(s) corresponding to the page masks bit. If the virtual address bit was masked, the local multiplexer outputs the corresponding virtual address bit in place of the corresponding physical address bit. If the virtual address bit was not masked, the local multiplexer selects the corresponding physical address bit data.

BRIEF DESCRIPTION OF THE DRAWINGS

The invention will be better understood from a reading of the following detailed description taken in conjunction with the drawing in which like reference designators are used to designate like elements, and in which.

DETAILED DESCRIPTION

Figure 1:
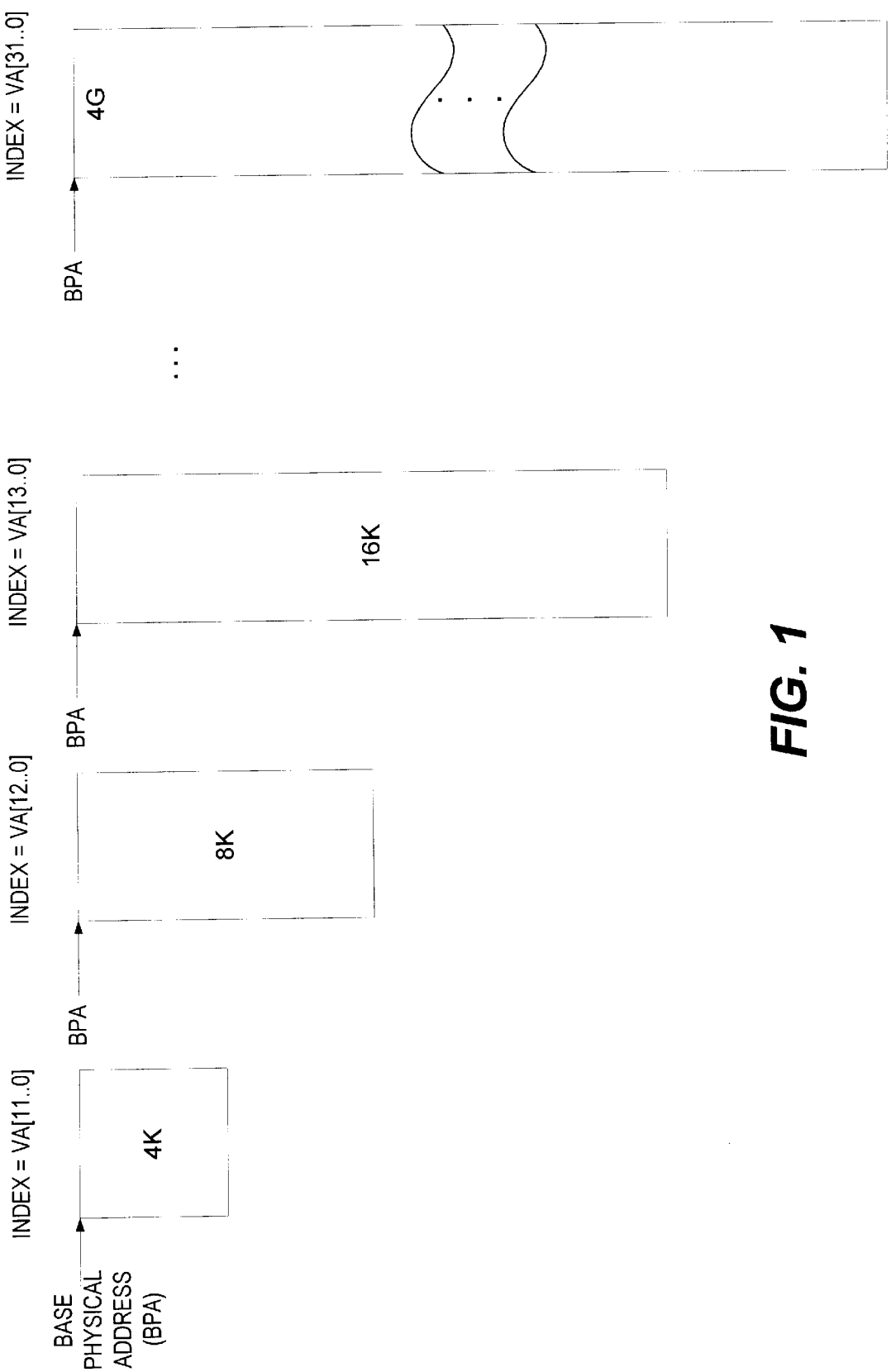
FIG. 1 is a block diagram illustrating the address space of a variable page size system.

FIG. 1 is a block diagram illustrating the address space of a variable page size system. In the illustrative embodiment described herein, the processor (not shown) can access a physical address space of 4 Gigabytes, which requires a physical address of 32 bits. In this example, the variable page sizes supported are 4K, 8K, 16K, 64K, 256K, 1M, 4M, 16M, 64M, 256M, 1G, and 4 Gbytes. Since the minimum page size is 4 Kbytes, the lower order virtual address bits VA[0 . . . 11] are always used as part of the offset address from the base address of the page. The offset address, also referred to as the index, is used to index into the page. The base physical address (BPA) PA[31 . . . x] is determined by performing an address translation on the upper order virtual address bits VA[31 . . . x], also called the virtual tag. In a system that supports variable size pages, the boundary x between the bits of the virtual tag and the index floats according to the selected page size. In the illustrative example, when the page size is the minimum of 4K, virtual address bits VA[31 . . . 12] operate as the tag and bits VA[11 . . . 0] operate as the index. In an 8K page, bits VA[31 . . . 13] operate as the tag and bits VA[12 . . . 0] operate as the index. In an 4G page, the TLB will always hit (in a 32-bit virtual address space) and bits VA[31 . . . 0] operate as the index.

The support of variable page sizes is accomplished through the use of a page mask. The page mask is a set of bits that correspond to address bits in the virtual address that may be ignored to increase the page size. For example, if in the example above, the page mask includes a page mask bit corresponding to each of virtual address bits VA[31 . . . 12]. If it is desired to set the page size to 8K, page mask bit PM[12] corresponding to virtual address bit VA[12] is set (i.e., page mask PM[31 . . . 12] has the value "00000000000000000001").

It is clear therefore that when the TLB tag array is searched for a particular matching tag of a requested address, masked bits are to be ignored to allow a TLB hit on any entry that matches all of the upper non-masked bits; however, the bits that were masked must therefore be included as part of the physical address since they operate as part of the index bits. As illustrated in FIG. 1, when the page size is set to 4 Kbytes, only bits VA[11 . . . 0] of the virtual address operate as the index into the 4K page. However, when the page size is set to 8K, the page size is twice as large; thus bit VA[12] of the virtual address must also be included in the index.

Figure 2:
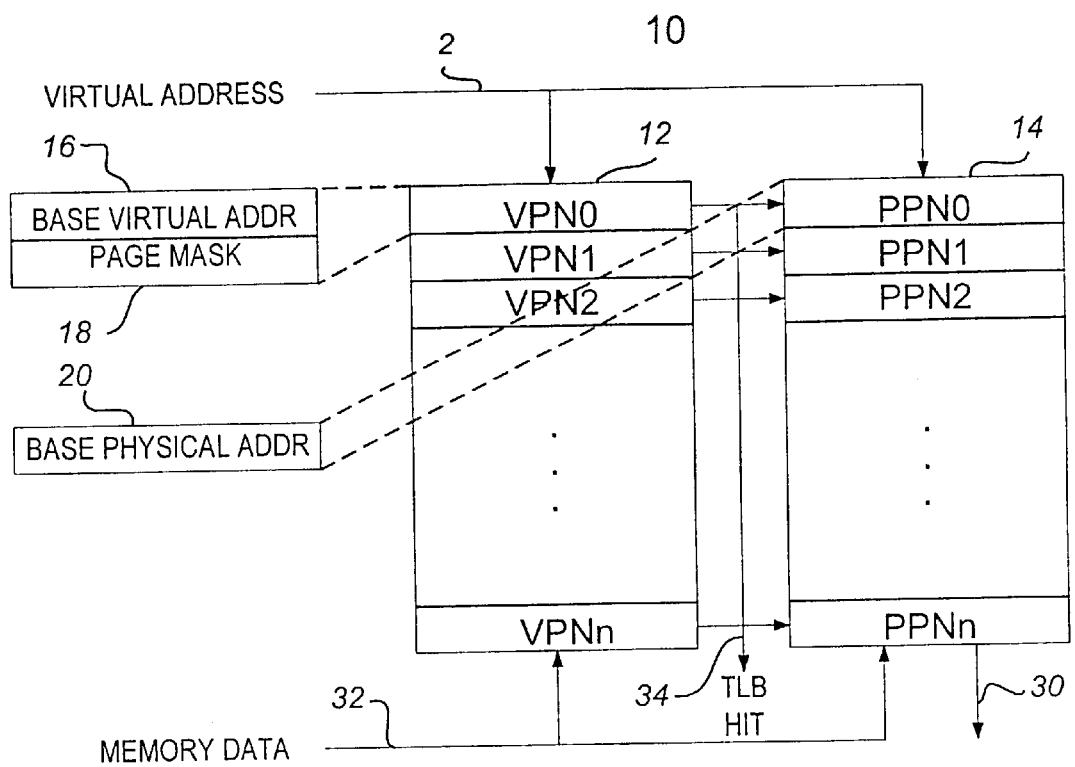
FIG. 2 is an example implementation of a prior art TLB that supports variable page sizes.

Reference is now made to FIG. 2 which illustrates an example implementation of a prior art TLB 10 that supports variable page sizes. For simplicity, the illustrative embodiment is a single-entry fully-associative direct-mapped cache. However, the inventive principles embodied in this example extend easily to multiple-entry, set-associative, and/or randomly-mapped caches. TLB 10 includes a virtual page number content addressable memory (CAM) 12 and a physical page number RAM array 14. Each entry in the TLB 10 comprises one slot VPN0 . . . VPNn in the virtual page number CAM 12 and a corresponding slot PPN0 . . . PPNn in the physical page number RAM 14.

Each virtual page number CAM 12 entry VPN0 . . . VPNn comprises a base virtual address 16 and a page size mask 18. While the range of valid block sizes set by page mask 18 is preferably between four Kilobytes and four Gigabytes, those skilled in the art will recognize other ranges without departing from the scope of the present invention.

Page mask 18 operates to exclude corresponding selective bits of the virtual address 2 from comparison with the base virtual addresses 16 when determining whether a TLB hit is detected. All virtual address bits that are not used in the comparison are passed on through unchanged as part of the physical address.

If a bit in the page mask 18 is set, the corresponding bit of the base virtual address 16 is excluded from the comparison by a comparator (not shown). When a hit is detected in the TLB 10, the contents of the associated physical address field are driven onto the address bus as described following. Each physical page number RAM 14 entry PPN0 . . . PPNn comprises a base physical address 20.

Figure 3:
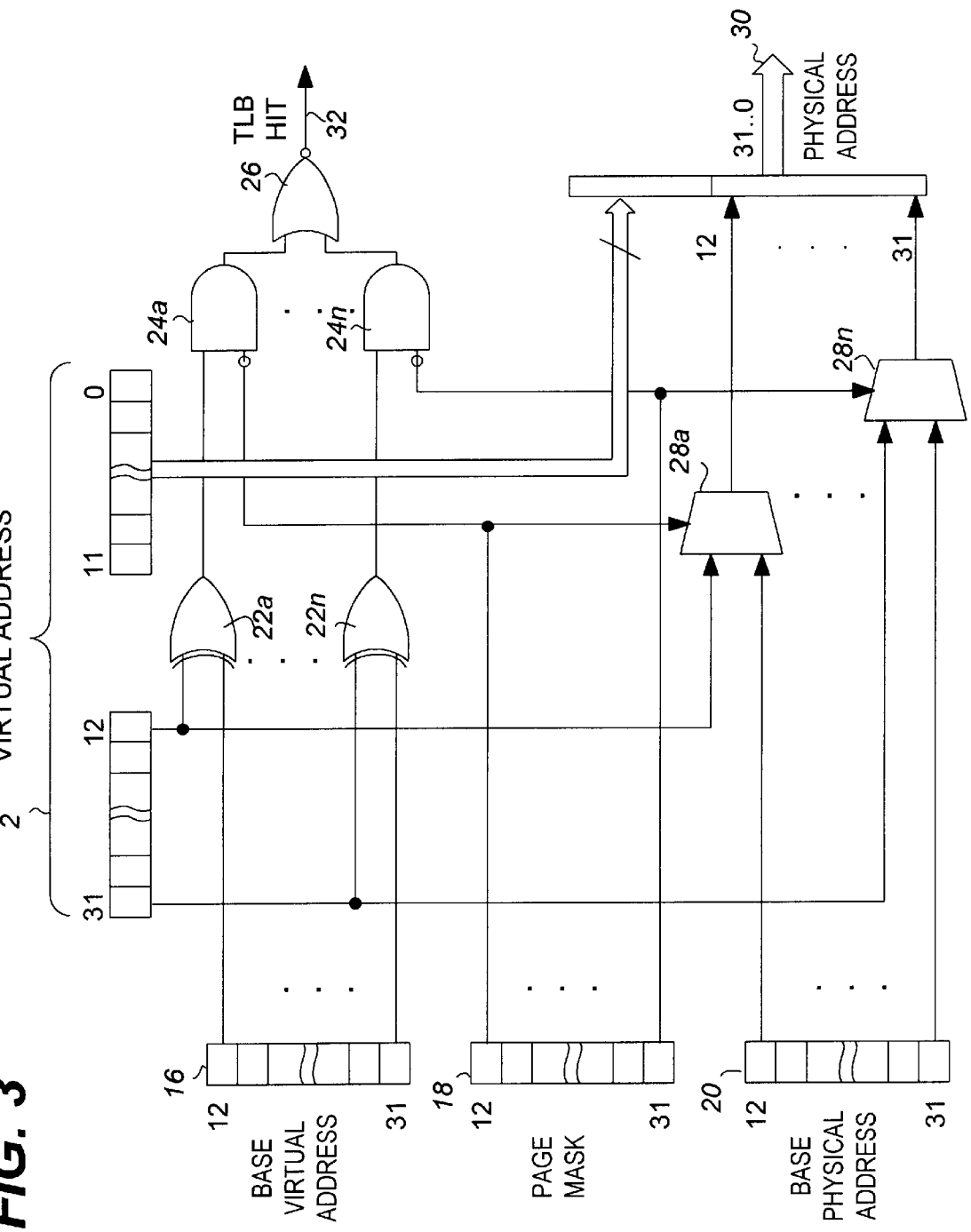
FIG. 3 is a schematic diagram depicting the virtual address to physical address translation of an individual entry in the TLB of FIG. 2.

Reference is now made to FIG. 3 which depicts a schematic diagram of an individual entry in the block TLB 10 of FIG. 2. Bits 31-12 of the virtual address 2 are logically exclusive-ORed (XORed) with the base virtual address 16 by gates 22a–22n. The outputs of gates 22a–22n are logically ANDed with the inversion of bits 31-12 set in the page mask 18 by AND gates 24a–24n. The outputs of gates 24a–24n are logically NORed together by n-input NOR gate 26 to form a hit signal 34 for the particular entry.

Bits VA[31-12] of the virtual address 2 and bits PA[31-12] of the base physical address 20 are respectively coupled to the inputs of a set of virtual address bypass multiplexers 28a–28n. The outputs of multiplexers 28a–28n form bits 12-31 of the physical address while bits 11-0 of the virtual address form bits 11-0 of the physical address. Virtual address bypass multiplexers 28a–28n are respectively controlled by bits 31-12 in the page mask 18. If a particular bit is set in the page mask 18, the comparison for that particular bit and the corresponding bit in the virtual address 16 is ignored. The selected multiplexer then passes that particular virtual address bit on through as part of the physical address. This is referred to herein as virtual address bypassing. In the prior art virtual address bypassing methodologies, as illustrated in FIG. 3, the page mask bits PM[31 . . . 12] are read out from the matching virtual page number CAM entry after a TLB match is signaled, and then used to mask off the physical address bits of the physical page number associated with the matching virtual page number. This additional multiplexing step therefore increases the access time of the data over what would otherwise be achievable with the cache for fixed-size paging.

In accordance with the invention, the physical page number RAM 14 is modified to store not only the physical page number bits as in the prior art, but also the page mask bits identical to its associated virtual page number entry in the virtual page number CAM 12, along with a local multiplexer for each page mask bit. In other words, the page mask bits are also stored statically in the physical page number RAM 14, which allows the physical address page masking to occur at the time the translation is entered into the TLB. The output of the local multiplexing remains static for the duration of the entry's presence in the TLB. Accordingly, the physical address masking is performed long before a relevant TLB search occurs, and eliminates the post-match multiplexing step, thereby improving the cache access time for caches that support variable page sizes to that of the cache as if it supported only a fixed page size.

Figure 4:
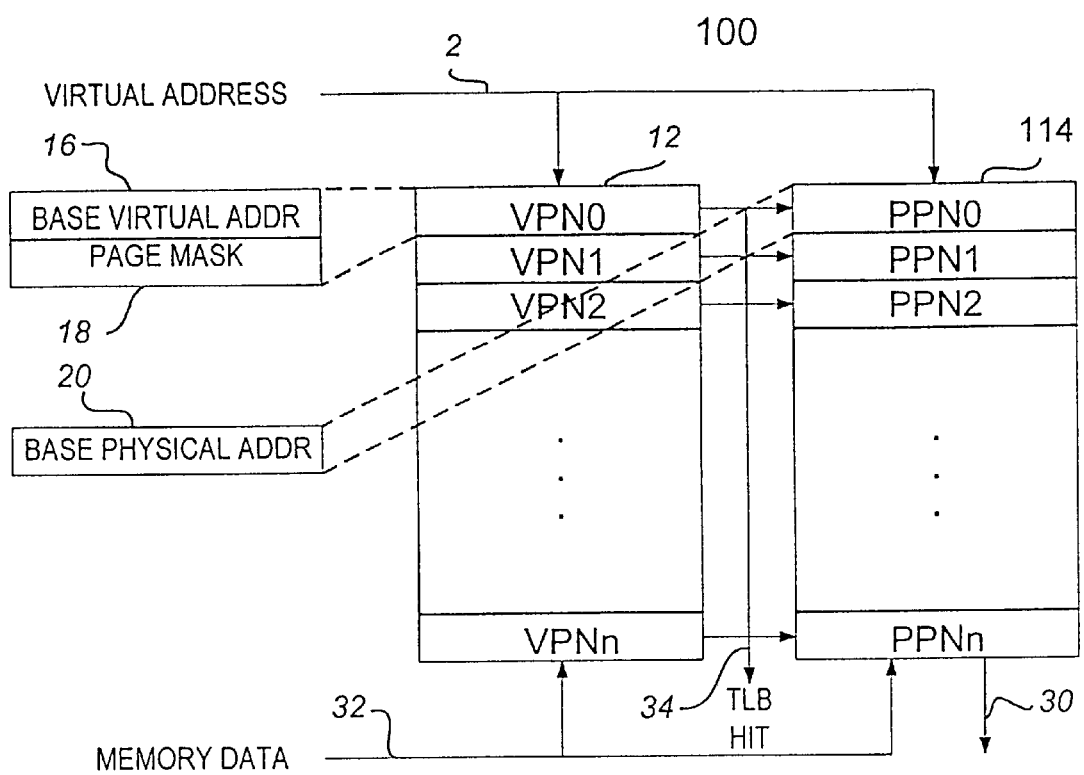
FIG. 4 is an example implementation of a TLB that supports variable page sizes in accordance with the invention.
Figure 5:
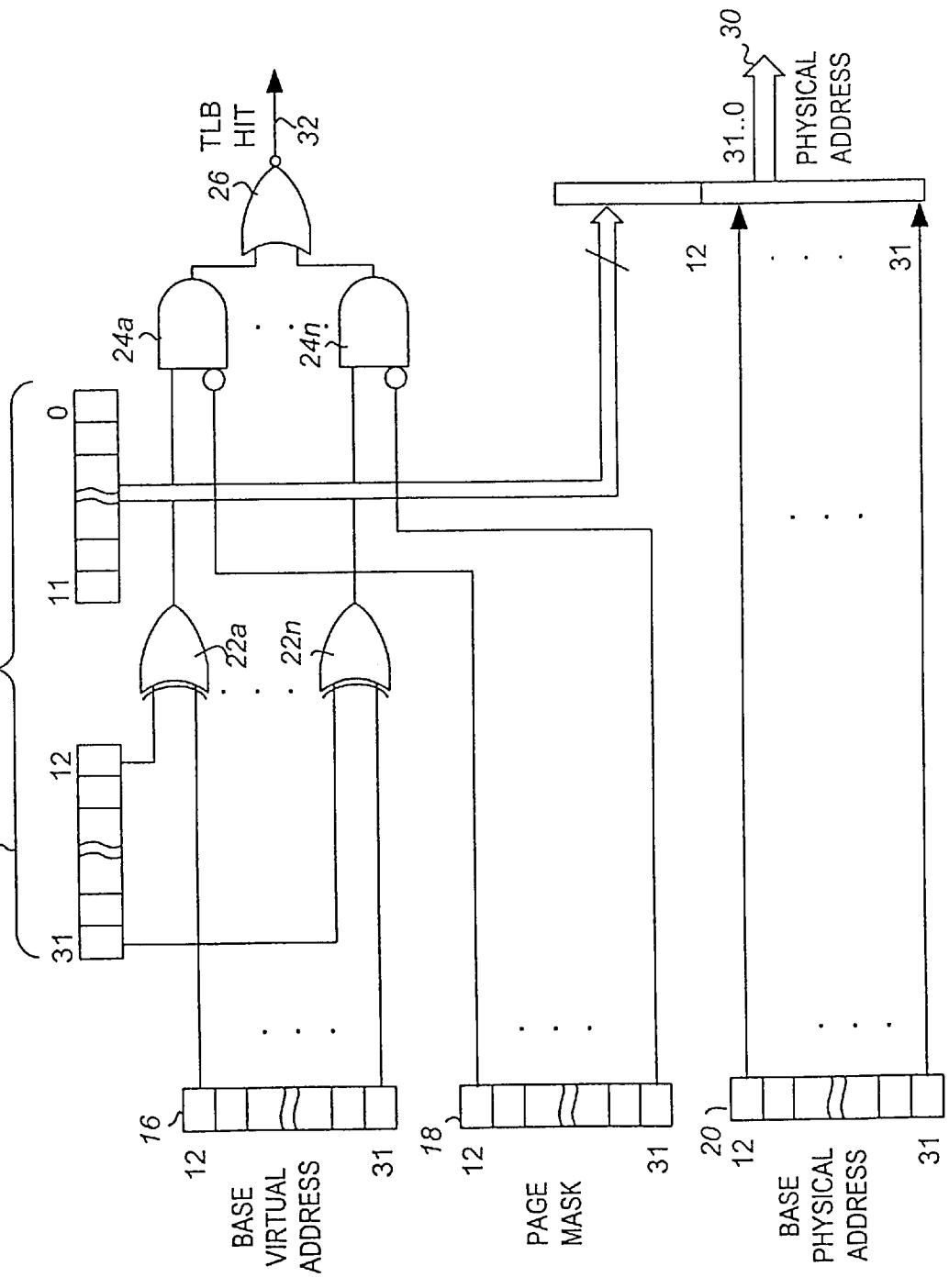
FIG. 5 is a schematic diagram depicting the virtual address to physical address translation of an individual entry in the TLB of FIG. 4.

FIGS. 4 and 5 illustrate an example of a cache system 100 that supports variable page sizes that is implemented in accordance with the invention. This system is identical to cache system 10 of FIGS. 2 and 3 with the exception of the implementation of physical page number RAM 114 in place of RAM 14 of FIG. 2, and the elimination of the virtual address bypass multiplexers 28a . . . 28n of FIG. 3.

In accordance with the invention, physical page number RAM 114 stores the page mask bits 18 along with the base physical address 20 associated with corresponding virtual page number slot. Physical page number RAM 114 also implements a local multiplexer for each stored page mask bit in the RAM 114, each of which performs local virtual address bypass multiplexing.

Figure 6:
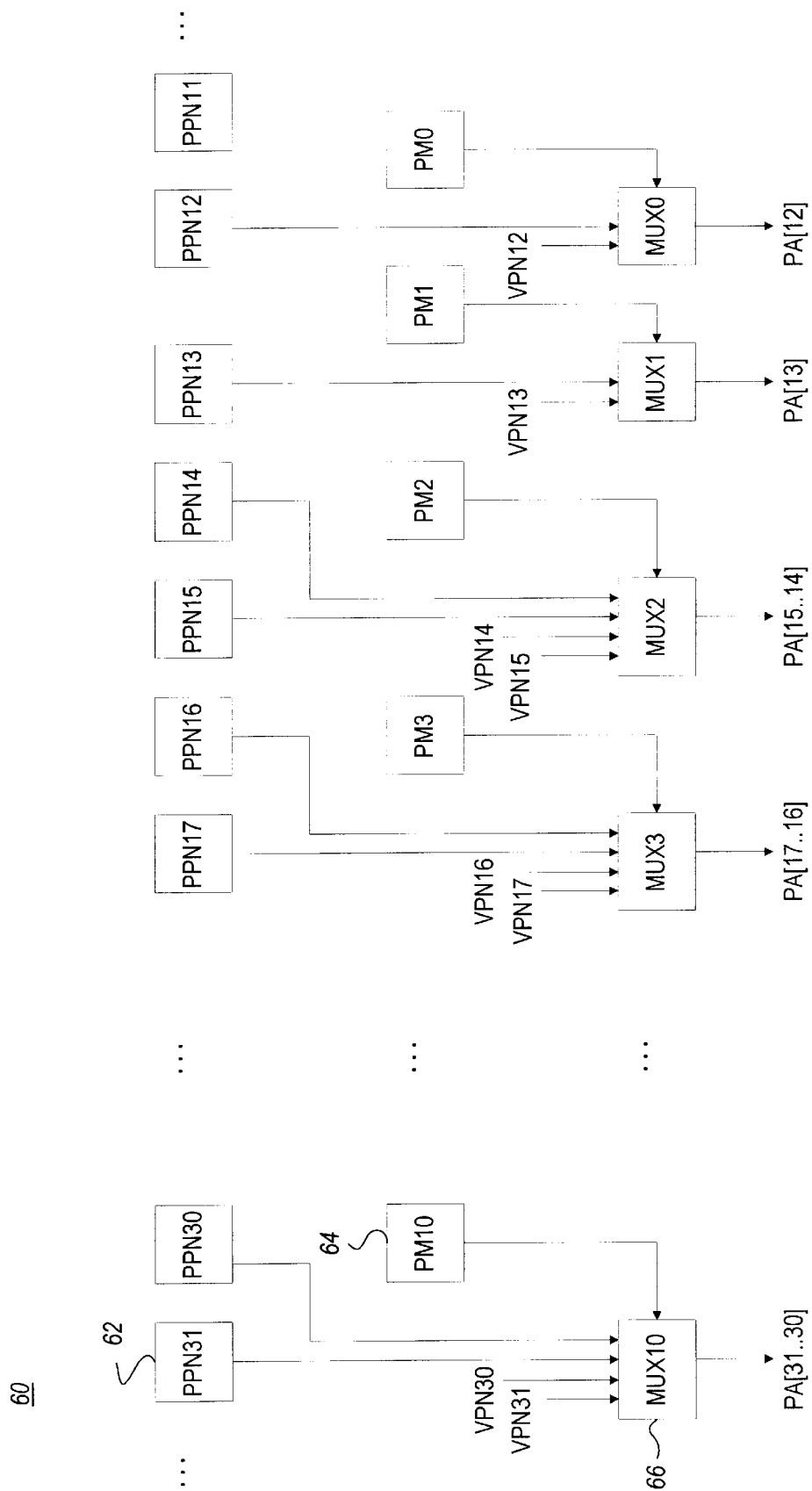
FIG. 6 is a block diagram illustrating an example embodiment of an entry in a physical page number RAM implemented in accordance with the invention.

FIG. 6 illustrates an example embodiment of an entry 60 in physical page number RAM 114. In the illustrative embodiment, the supported page sizes are 4K, 8K, 16K, 64K, 256K, 1M, 4M, 16M, 64M, 256M, 1G, and 4 GBytes. Accordingly, the lowest order page mask bits correspond to a power-of-2 increase in page size, and the remaining page mask bits each correspond to a power-of-4 increase in page size. In the illustrative embodiment, each physical page number RAM entry comprises thirty-two physical page number bits PPN[0 . . . 31] and eleven page mask bits PM[0 . . . 10]. The page mask bits PM[0 . . . 10] are interleaved with their corresponding physical page number bits PPN[0 . . . 31]. Specifically, in this embodiment, page mask bit PM[0] corresponds to PPN[12] and is interleaved between physical page number bits PPN[12] and PPN[13]; page mask bit PM[1] corresponds to PPN[13] and is interleaved between physical page number bits PPN[13] and PPN[14]; page mask bit PM[3] corresponds to PPN[15 . . . 14] and is interleaved between physical page number bits PPN[14] and PPN[15]; page mask bit PM[4] corresponds to PPN[17 . . . 16] and is interleaved between physical page number bits PPN[16] and PPN[17]; and so on, as shown.

Each physical page number entry 60 includes a physical page number storage cell 62, interleaved as described above with a page mask storage cell 64. Each page mask storage cell 64 controls a multiplexer 66 which receives as input the data of its corresponding physical page number storage cell(s) 62 PPN[x] and the incoming virtual address VA[x], where x is the bit number(s) associated with the multiplexer 66. When the page mask is set, the data of the respective virtual address bits VA[x] is transferred to the corresponding output physical address bit PA[x] to allow it to be used as part of the index into the physical page. When the page mask is not set, indicating that the virtual address bit VA[x] was not masked on the virtual address lookup, the corresponding output physical address bit PA[x] is the physical address bit PPN[x] stored in the physical page number cell 62.

Figure 7A:
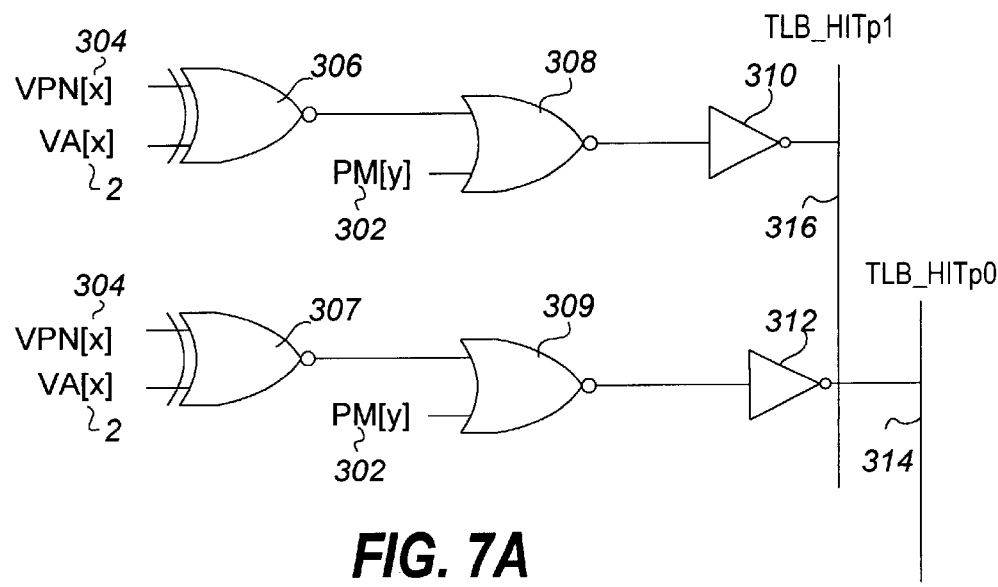
FIG. 7A is a logic diagram of a dual-ported virtual page number CAM cell and page mask cell of a power-of-2 mask in accordance with the illustrative embodiment of the invention.
Figure 7B:
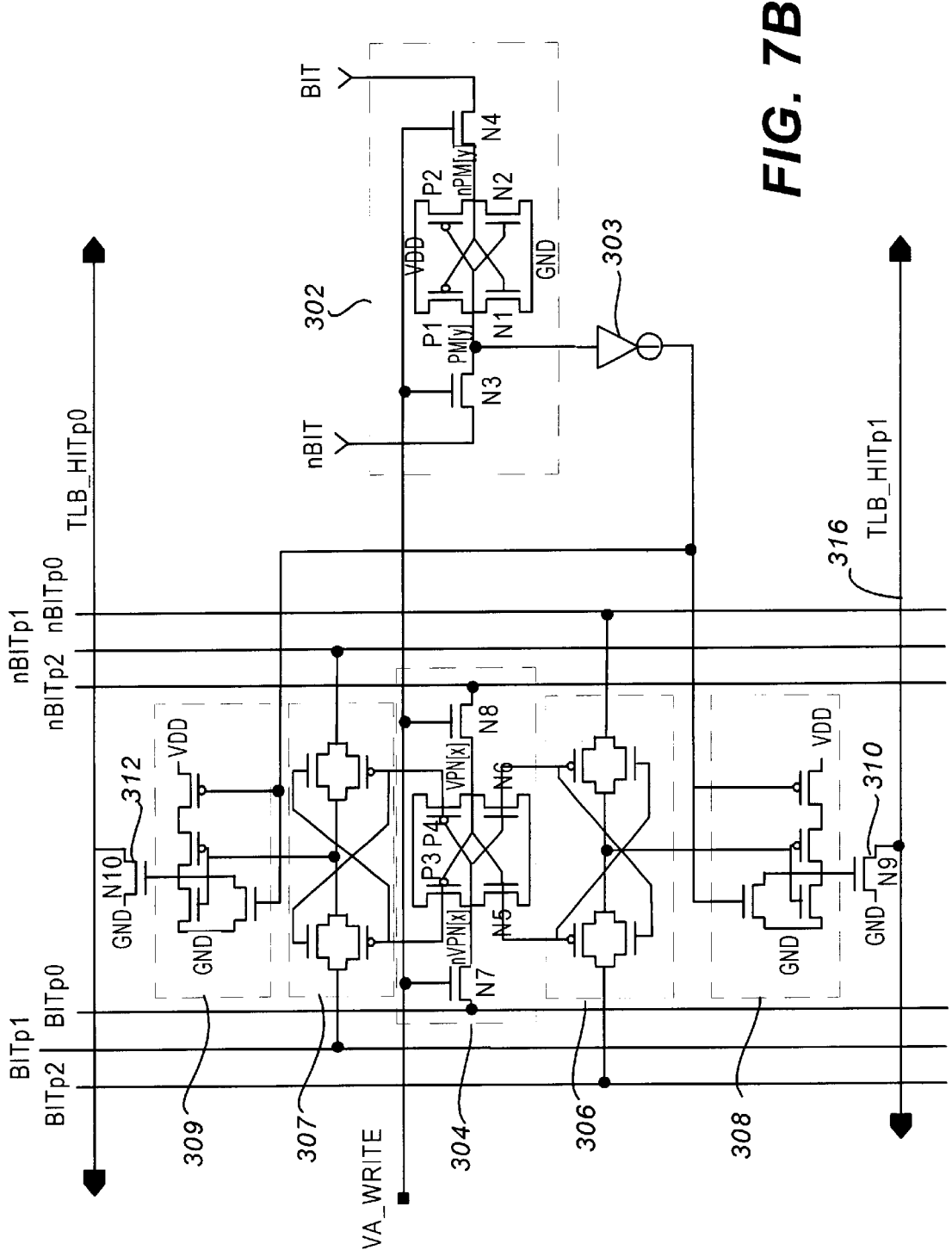
FIG. 7B is a schematic diagram of a dual-ported virtual page number CAM cell and page mask cell of a power-of-2 mask in accordance with the illustrative embodiment of the invention.

FIG. 7A is a logic diagram and FIG. 7B is a corresponding schematic diagram of a dual-ported virtual page number CAM cell 300 and page mask cell 302 of a power-of-2 mask (i.e., VPN[12] and PM[0], or VPN13 and PM[1]).

As illustrated in FIG. 7A, the virtual page number bit VPN[x] stored in cell 304 is compared with the corresponding bit VA[x] of the incoming virtual address 2. In the illustrative embodiment, an exclusive NOR 306 is performed. The output of the comparison is masked with the page mask bit PM[y] of cell 302 to determine whether or not to ignore the comparison. If the PM bit is set, the bit is masked and the comparison is ignored. This is achieved by NORing 308 the output of the comparison with the page mask bit PM[y] 302 corresponding to bit x. The output of the NOR gate 308 is inverted 303 and used as the TLB hit signal TLB_HIT 316. FIG. 7B illustrates a dual-port schematic representation of the logic of FIG. 7A. It will be noted that the TLB hit line 316 is connected to the outputs of all of the comparisons of the virtual address. Thus, if any one of the VPN[x] bits do not match the corresponding VA[x] of the incoming virtual address, the TLB hit line 316 will be pulled low to indicate a mismatch. In other words, all of the VPN bits in the TLB entry must match the virtual address bits unless the bit is masked.

As illustrated in FIG. 7B, cell 300 includes a 6-transistor page mask storage cell 302 which stores a page mask bit and a 6-transistor physical page number bit storage cell 304 which stores a neighboring physical page number bit.

Figure 8A:
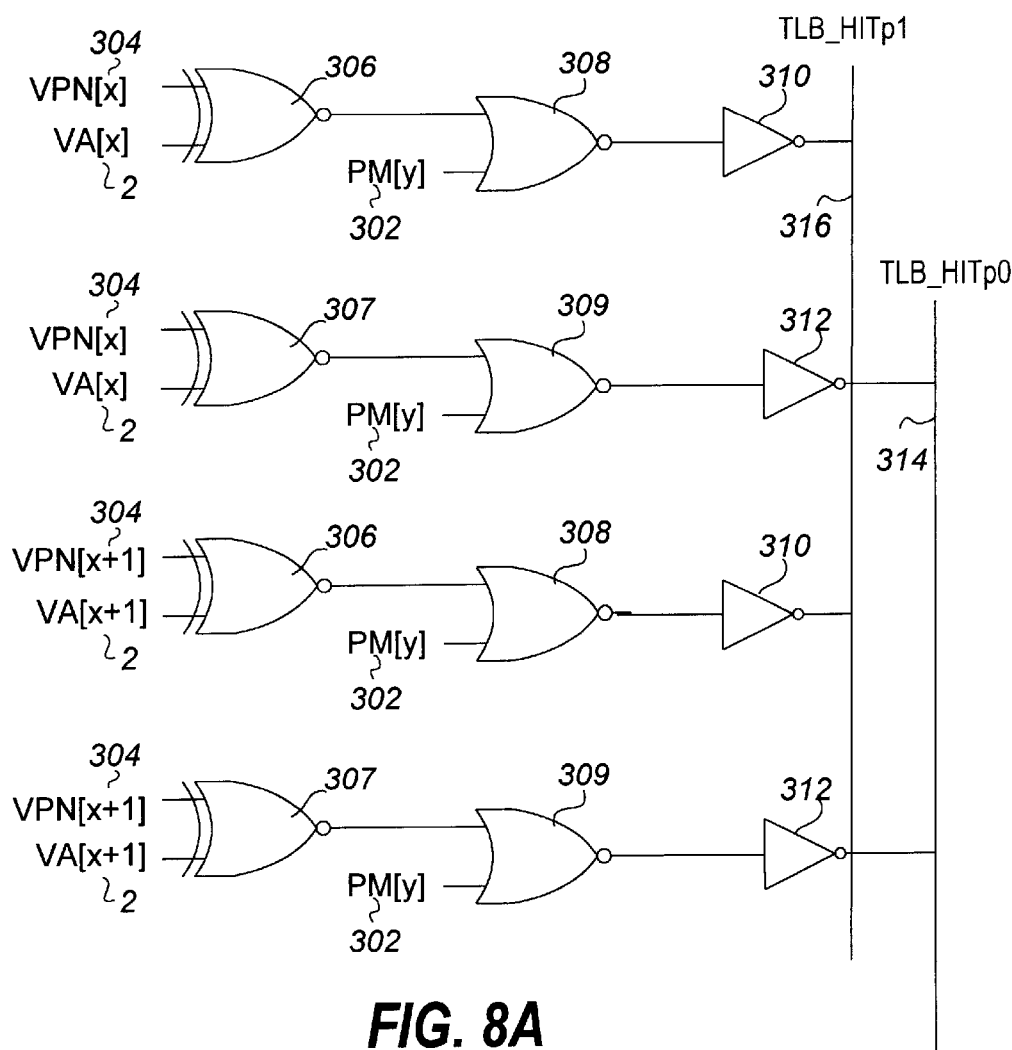
FIG. 8A is a logic diagram of a pair of dual-ported virtual page number CAM cells and associated page mask cell of a power-of-4 mask in accordance with the illustrative embodiment of the invention.
Figure 8B:
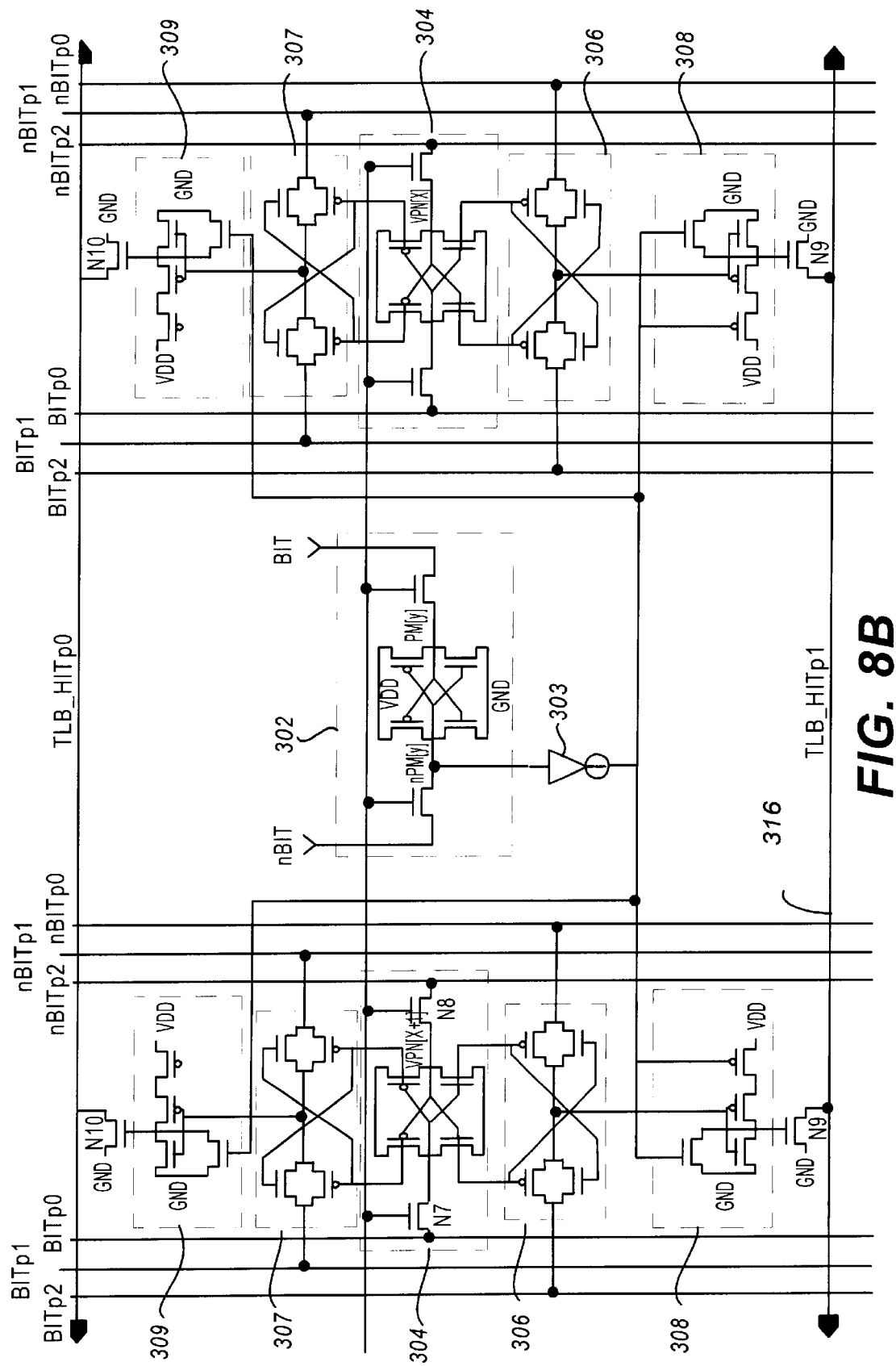
FIG. 8B is a schematic diagram of a pair of dual-ported virtual page number CAM cells and associated page mask cell of a power-of-4 mask in accordance with the illustrative embodiment of the invention.

FIG. 8A is a logic diagram and FIG. 8B is a corresponding schematic diagram of a pair of dual-ported virtual page number CAM cells 400 and page mask cell 402 of a power-of-4 mask in the virtual page number RAM (i.e., VPN[15 . . . 14] and PM[2], or VPN[17 . . . 16] and PM[3], and so on up to PPN[31 . . . 30] and PM[10] of FIG. 6). The operation of RAM cell 400 is identical to that of RAM cell 300 of FIG. 7A and 7B, except that the page mask bit PM[y] is used to mask both neighboring virtual address comparison bits.

Figure 9:
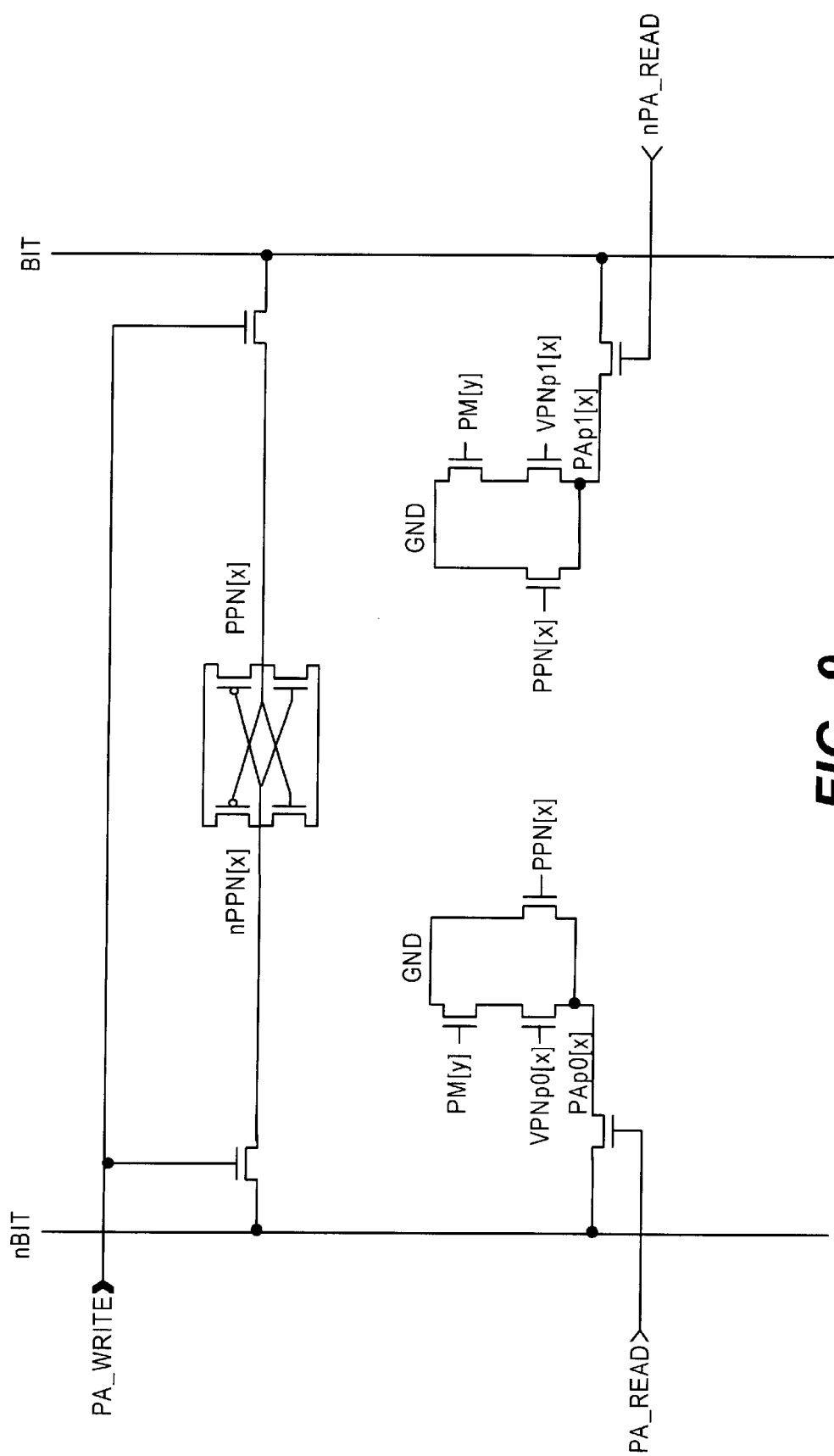
FIG. 9 is a schematic diagram of a multiplexer cell illustrating an example embodiment of a physical address RAM cell and associated multiplexer used in the implementation of the physical address RAM of the TLB of the invention.

FIG. 9 is a schematic diagram of a multiplexer cell 66 illustrating an example embodiment of a multiplexer 66 and physical address RAM cell 62 used in the implementation of the invention. Multiplexer 66 receives the physical page number bit PPN[x] stored in cell 62 and the virtual page number bit VPN[x] of the matching entry of the virtual address RAM 12. If page mask bit PM[y] is not set (i.e., is 0), the output physical address PA[x] of the multiplexer 66 is the PPN[x] bit. If page mask bit PM[y] is set, the circuitry guarantees that PPN[x] is 0, and the output physical address PA[x] of the multiplexer 66 is the VPN[x] bit.

The local virtual address bypassing multiplexing operation of the invention described in detail above significantly improves over prior art virtual address bypassing techniques. The local multiplexing function is performed prior to the occurrence of a TLB hit, thereby eliminating any post-match multiplexing delay. This technique significantly reduces the virtual address to physical address translation time.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A translation lookaside buffer (TLB) for a cache, the cache receiving a virtual address comprising a virtual page number and a virtual index and translating the virtual address to a physical address of a page stored in said cache if the page is present in the cache, the TLB comprising:

a virtual page number array comprising a plurality of virtual page numbers; and a physical page number array comprising:

a plurality of physical page number entries each comprising a physical page number respectively associated with at least one of said virtual page numbers stored in said virtual page number array and each associated with a corresponding base physical address of a corresponding page stored in said cache; and a multiplexer controlled by a page mask which multiplexes respective portions of said virtual page number and said physical page number, said multiplexer outputting said physical page number portion as a portion of said physical address when the page mask indicates that said virtual page number portion is not masked, and outputting said virtual page number portion when said page mask indicates that said virtual page number portion is masked.

2. The TLB of claim 1, wherein each of said plurality of physical page number entries further comprises: a page mask indicating the size of said corresponding base physical address of said corresponding page stored in said cache.

3. A method of accessing data in a cache, the method comprising the following steps:

receiving a virtual address, the virtual address including a virtual page number and a virtual index;

masking respective portion of the virtual page number with corresponding page mask;

comparing said respective masked portion of the virtual page number of said received virtual address to respective portion of a base virtual page number to locate a matching physical page number;

multiplexing said respective portion of said virtual page number and corresponding portion of said matching physical page number to output said matching physical page number portion as a portion of a physical address when the corresponding page mask indicates that said virtual page number portion is not masked, and to output said virtual page number portion when said corresponding page mask indicates that said virtual page number portion is masked.

4. A translation lookaside buffer (TLB) for a cache, the cache receiving a virtual address comprising a virtual page number and a virtual index and translating the virtual address to a physical address of a page stored in said cache if the page is present in the cache, the TLB comprising:

a physical page number associated with a base physical address of said page stored in said cache;

a virtual page number associated with the physical page number;

a page mask associated with said page stored in said cache to indicate its size, said page mask corresponding to corresponding respective portions of said virtual page number and said physical page number; and a multiplexer which multiplexes said respective portions of said virtual page number and said physical page number corresponding to said page mask, to output said physical page number portion when said corresponding page mask portion indicates that said corresponding virtual page number portion not masked, and to bypass said physical page number portion and output in its place said corresponding virtual page number portion when said corresponding page mask portion indicates that said corresponding virtual page number portion is masked.

* * * * *